(12) United States Patent
Sarkar et al.

(10) Patent No.: US 12,411,727 B1
(45) Date of Patent: Sep. 9, 2025

(54) INTELLIGENT CONTAINER MANAGEMENT UTILIZING RUNTIME MUTATING WEBHOOK

(71) Applicant: International Business Machines Corporation, Armonk, NY (US)

(72) Inventors: Debabrata Sarkar, Sutton (GB); Dipesh Rawat, Winchester (GB); Kishor Shankarrao Kulkarni, Gadag (IN); Matthew John Comer, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 18/596,092

(22) Filed: Mar. 5, 2024

(51) Int. Cl.
G06F 11/07 (2006.01)

(52) U.S. Cl.
CPC ...... *G06F 11/0793* (2013.01); *G06F 11/0709* (2013.01)

(58) Field of Classification Search
CPC ................ G06F 11/0793; G06F 11/0709
See application file for complete search history.

(56) References Cited

U.S. PATENT DOCUMENTS

| | | | | |
|---|---|---|---|---|
| 8,620,851 B2 * | 12/2013 | Brown | ............... | G06Q 10/0633 706/52 |
| 8,990,608 B1 * | 3/2015 | Gupta | ................ | G06F 11/2028 714/3 |
| 9,262,519 B1 | 2/2016 | Saurabh et al. | | |
| 9,645,811 B2 | 5/2017 | Carlen et al. | | |
| 10,142,204 B2 | 11/2018 | Nickolov et al. | | |
| 11,204,840 B2 | 12/2021 | Nair et al. | | |
| 2014/0298091 A1 * | 10/2014 | Carlen | ...................... | G06F 9/54 714/15 |
| 2020/0034178 A1 * | 1/2020 | Gupta | ................. | G06F 9/45558 |
| 2022/0311794 A1 * | 9/2022 | Maya | .................. | G06F 11/0766 |

(Continued)

FOREIGN PATENT DOCUMENTS

| CN | 116302331 A | 6/2023 |
|---|---|---|
| CN | 116755836 A | 9/2023 |

OTHER PUBLICATIONS

Kandya, "Deterministic Performance on Kubernetes," Linköping University Department of Computer and Information Science, Jun. 22, 2023, 62 pages, https://liu.diva-portal.org/smash/get/diva2:1773510/FULLTEXT01.pdf.

(Continued)

*Primary Examiner* — Matthew M Kim
*Assistant Examiner* — Kayo Lisa Rusin
(74) *Attorney, Agent, or Firm* — Yee & Associates, P.C.

(57) ABSTRACT

Intelligent container management is provided. An issue that caused a failed state of a container is identified based on an analysis of exit code information, container log information, host node agent log information, and resource utilization data corresponding to the container using a group of solution agents. It is determined whether the issue that caused the failed state of the container is a resolvable issue with a fix. The fix is applied to the container using a runtime mutating webhook controller prior to restart of the container in response to determining that the issue that caused the failed state of the container is the resolvable issue with the fix. The restart of the container is performed on a host node.

20 Claims, 6 Drawing Sheets

(56) References Cited

U.S. PATENT DOCUMENTS

| | | | |
|---|---|---|---|
| 2023/0229561 A1* | 7/2023 | Iyer | G06F 11/0793 |
| | | | 711/162 |
| 2023/0359402 A1* | 11/2023 | Bernat | G06F 21/78 |
| 2023/0393927 A1* | 12/2023 | Karr | G06F 11/0793 |
| 2024/0281316 A1* | 8/2024 | Revanna | G06F 11/0793 |
| 2024/0362119 A1* | 10/2024 | Kumar | G06F 11/0793 |

OTHER PUBLICATIONS

Wang et al., "CloudRanger: Root Cause Identification for Cloud Native Systems," 2018 18th IEEE/ACM International Symposium on Cluster, Cloud and Grid Computing (CCCGRID), 2018, pp. 492-502, https://ieeexplore.IEEE.org/abstract/document/8411065.

* cited by examiner

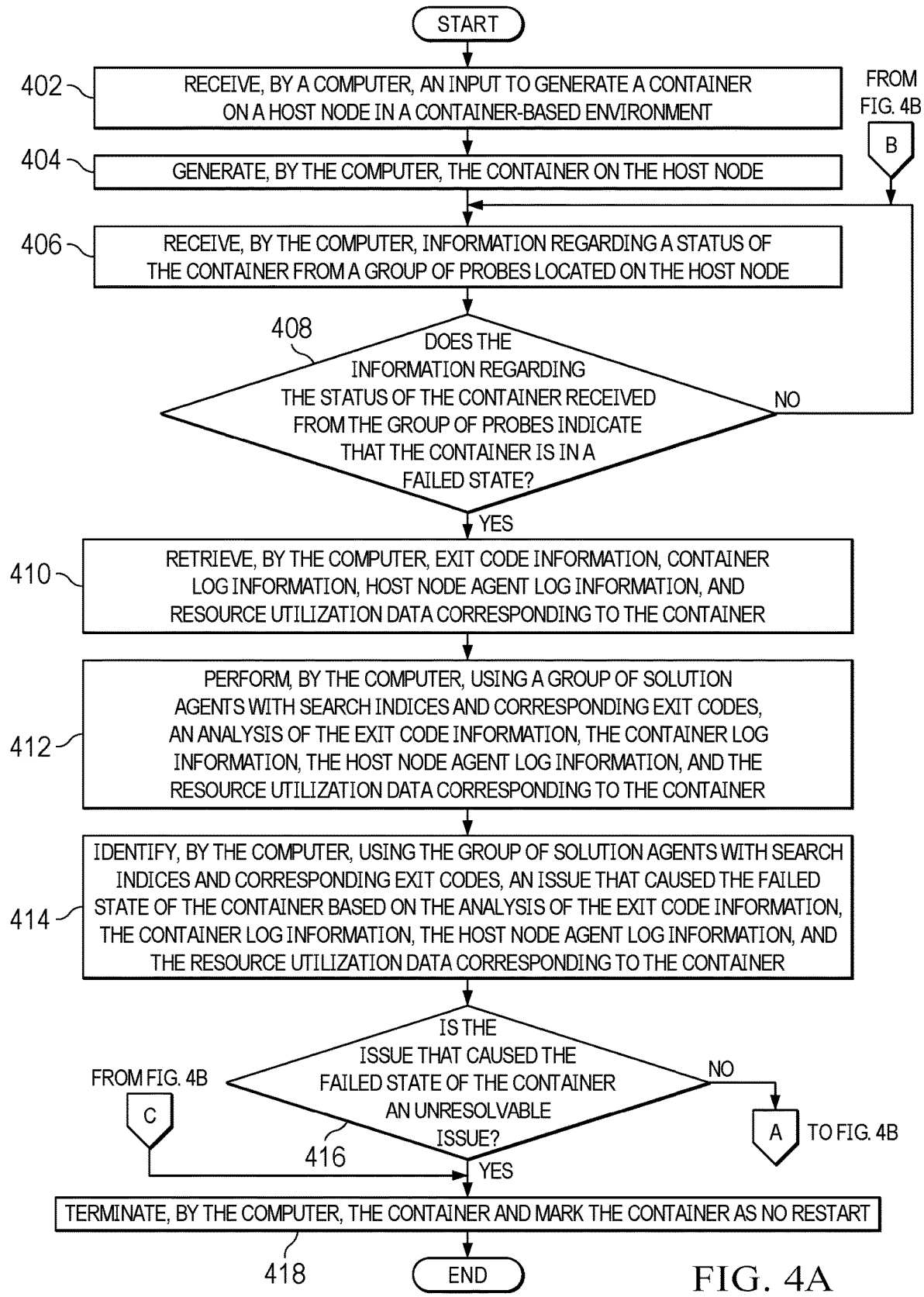

INTELLIGENT CONTAINER MANAGEMENT UTILIZING RUNTIME MUTATING WEBHOOK

BACKGROUND

The disclosure relates generally to container-based environments and more specifically to managing containers in a container-based environment.

A container-based environment, architecture, platform, or the like, such as, for example, Kubernetes® (a registered trademark of the Linux Foundation of San Francisco, CA, USA), provides a structural design for automating deployment, scaling, and operations of containers across host nodes. A host node is a machine, either physical or virtual, where containers (i.e., applications providing services) are deployed. The container includes the environment for the application to run (e.g., filesystems, environment variables, port mappings, and the like).

The container-based environment includes a controller node, which is a main controlling unit of a group of host nodes, managing the group's workload, and directing communication across the group. The controller node consists of various components, such as, for example, an application programming interface (API) server, scheduler, and the like. The API server provides internal and external interfaces for the controller node. The API server processes and validates resource availability requests. The scheduler selects which host node a container runs on based on resource availability of respective host nodes. The scheduler tracks resource utilization on each of the host nodes.

SUMMARY

According to one illustrative embodiment, a computer-implemented method for intelligent container management is provided. A computer, using a group of solution agents, identifies an issue that caused a failed state of a container based on an analysis of exit code information, container log information, host node agent log information, and resource utilization data corresponding to the container. The computer determines whether the issue that caused the failed state of the container is a resolvable issue with a fix. The computer, using a runtime mutating webhook controller, applies the fix to the container prior to restart of the container in response to the computer determining that the issue that caused the failed state of the container is the resolvable issue with the fix. The computer performs the restart of the container on a host node. According to other illustrative embodiments, a computer system and computer program product for intelligent container management are provided.

BRIEF DESCRIPTION OF THE DRAWINGS

FIGS. 4A-4B are a flowchart illustrating a process for intelligent container management in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
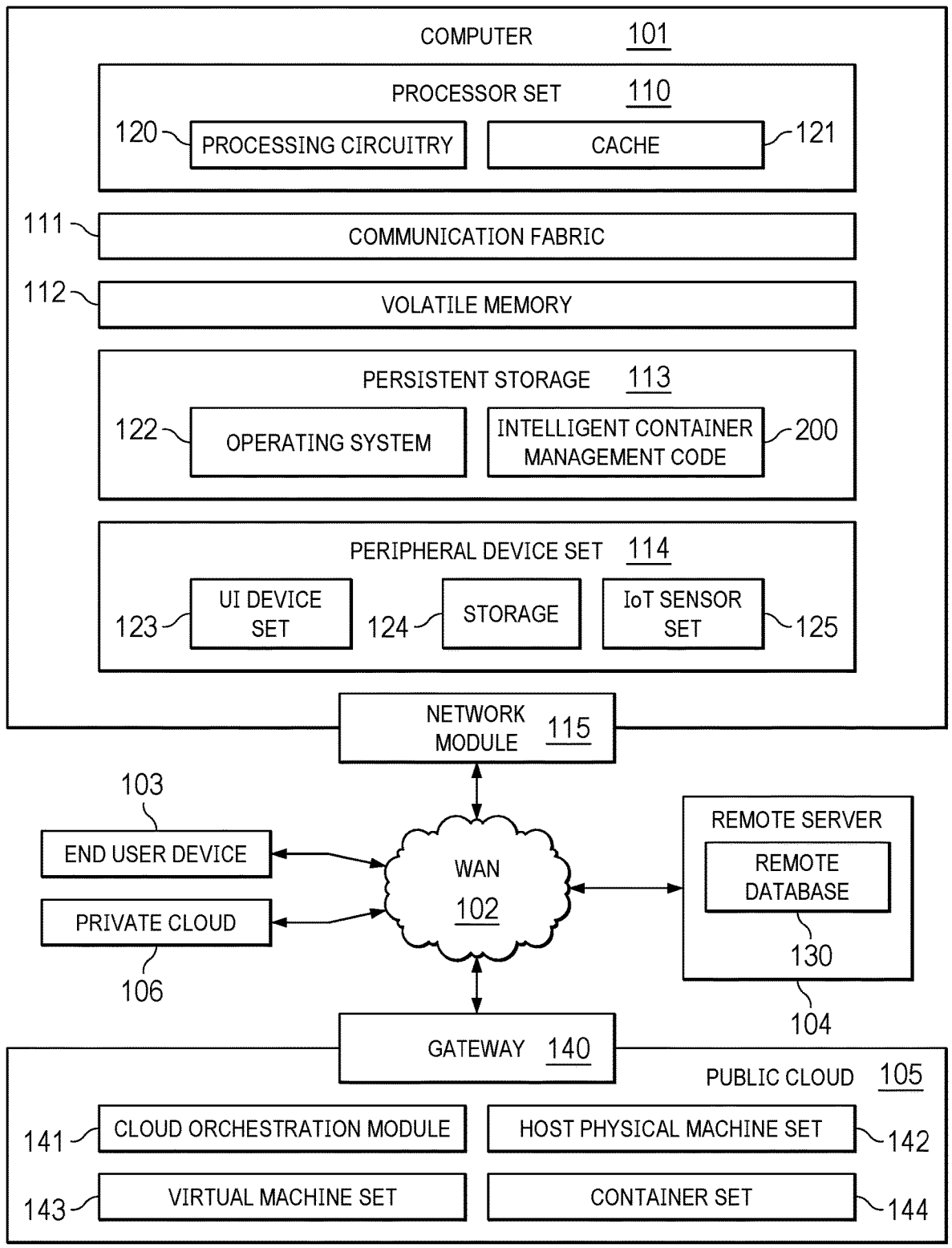
FIG. 1 is a pictorial representation of a computing environment in which illustrative embodiments may be implemented.
Figure 2:
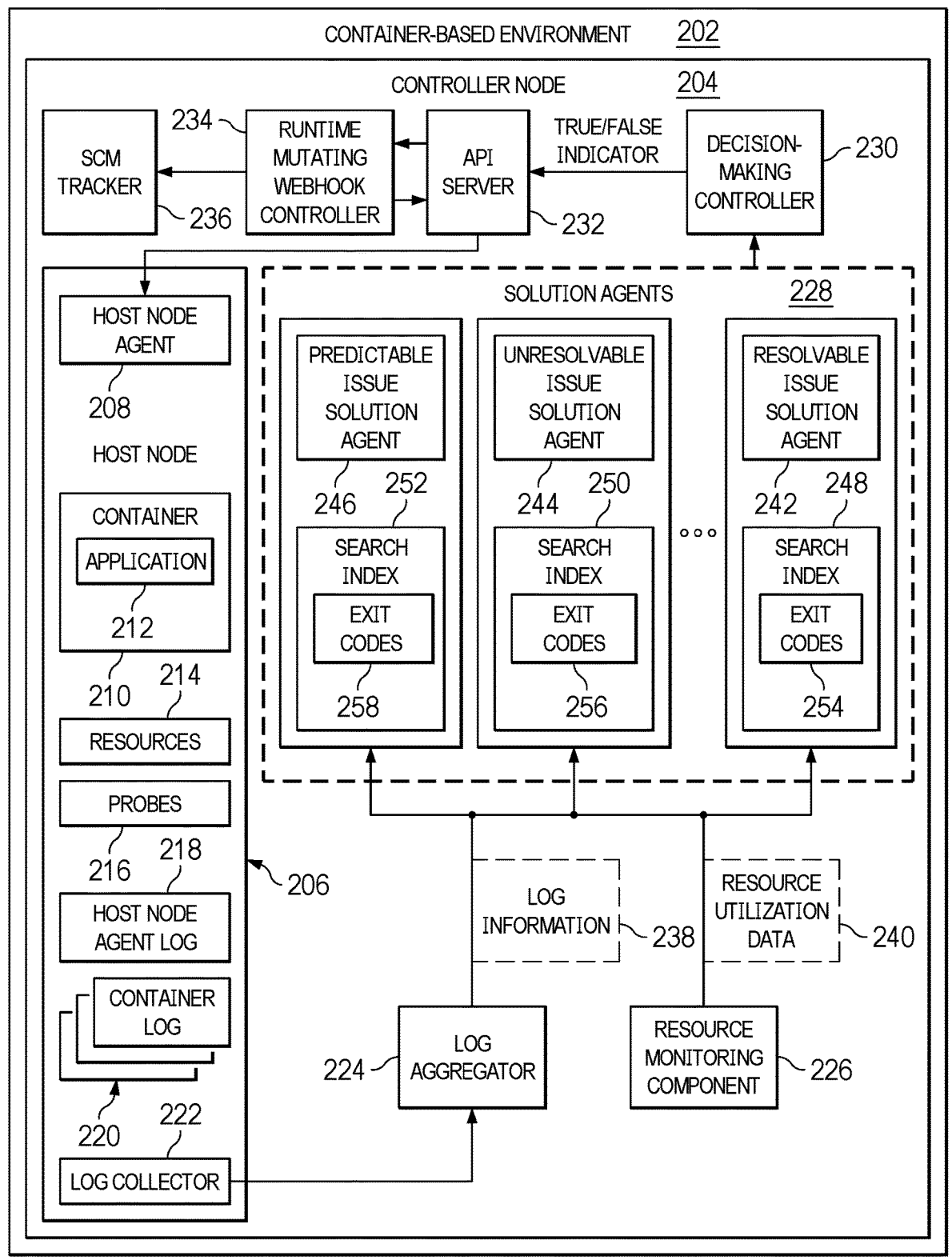
FIG. 2 is a diagram illustrating an example of an intelligent container management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as intelligent container management code 200. For example, intelligent container management code 200 classifies container failures using a group of solution agents and then applies appropriate fixes to the failed containers via a runtime mutating webhook controller whenever applicable. For example, intelligent container management code 200 utilizes runtime container logs and runtime resource utilization monitoring data to determine container failures and classify the container failures as resolvable issues, unresolvable issues, or predictable issues. If intelligent container management code 200 identifies a container failure as a resolvable issue using a particular solution agent of the group of solution agents, then intelligent container management code 200 utilizes that particular solution agent to correlate the resolvable issue that caused the failure to a fix. Afterward, intelligent container management code 200 utilizes the runtime webhook controller to apply the fix to the failed container prior to restart. Further, intelligent container management code 200 records the fix for the failed container in a source code management tracker for future reference and audit purposes. If intelligent container management code 200 identifies the failure as an unresolvable issue using a different solution agent in the group of solution agents, then intelligent container management code 200 terminates the failed container, generates an event specifying that restart will not help the failed container achieve a healthy state, and marks the failed container as "no restart."

In addition to intelligent container management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and intelligent container management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in intelligent container management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator utilizing the intelligent container management services provided by computer 101), and may take any of the forms discussed above in connection with computer 101. EUD 103 typically receives helpful and useful data from the operations of computer 101. For example, in a hypothetical case where computer 101 is designed to provide a container management recommendation to the end user, this recommendation would typically be communicated from network module 115 of computer 101 through WAN 102 to EUD 103. In this way, EUD 103 can display, or otherwise present, the container management recommendation to the end user. In some embodiments, EUD 103 may be a client device, such as thin client, heavy client, mainframe computer, desktop computer, laptop computer, tablet computer, smart phone, smart glasses, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a container management recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Current container-based environments, such as, for example, Kubernetes, utilize three types of probes to monitor containers. The three types of probes include start-up probes, readiness probes, and liveness probes. Start-up probes ensure that containers are fully initialized before the containers are made available. In other words, start-up probes determine whether an application in a container has started running. Readiness probes determine whether containers are ready to handle traffic, ensuring that the containers are in a healthy state. In other words, readiness probes determine whether the application running in the container is ready to accept requests. Liveness probes continuously monitor containers to detect failures, unresponsiveness, and the like. In other words, liveness probes determine whether the container is operating. If the container is operating, then no action is taken. If the container is not operating, then a host node agent (e.g., a kubelet or the like) of the host node directs the API server of the controller node to terminate and restart the container.

In the case of a readiness probe, the container has started, but the container is not ready to accept incoming requests. This situation may occur due to excessive load or high processing demands. Once the load decreases, the readiness probe passes the container (i.e., the container is now ready to accept incoming requests). However, in the case of when a start-up probe or a liveness probe fails a container, the container is not alive and should be restarted. If a restart of the container does not resolve the issue, then the container's ready state is false, and its status is "crashloopback." Currently, no solution exists that can determine whether a container restart will resolve the issue or not. When a container is continuously restarted and enters a failed state, unnecessary consumption of host node resources occurs. For example, restarting the container repeatedly when the container is expected to fail can result in additional processor and memory utilization on the host node without resolution of the underlying issue, error, or problem.

Illustrative embodiments take into account and address, for example, inefficient container restart behavior, blind container restarts, lack of application-specific information, limited failure recovery, lack of diagnostic information, lack of proactive resource monitoring, and the like, which are associated with current container-based environments. For example, illustrative embodiments analyze and index a group of logs (e.g., container logs, host node agent logs, and the like), analyze resource utilization monitoring data, and analyze container exit codes to determine the issue or reason the container entered a failed state.

Typical reasons for a container to enter a failed state include resolvable issues and unresolvable issues. Resolvable issues include, for example, network errors, port errors (e.g., the container is trying to access a port that is already being used by another container), memory errors (e.g., memory allocation for the container is set too low causing the container to be terminated by an out of memory error), processor error (e.g., processor allocation for the container is set too low causing the container to be terminated for lack of data processing capability), filesystem error (e.g., lack of permission to access a read only filesystem), and the like. Unresolvable issues include, for example, container misconfiguration due to a typographical error in the configuration file, a resource is not available such as when a persistent data volume is not mounted, wrong command line arguments such as missing arguments or incorrect arguments, application bugs and exceptions, and the like.

As a result, illustrative embodiments categorize a container failure as a resolvable issue, an unsolvable issue, or a predictable issue. Illustrative embodiments categorize any non-application specific issue, which has a known fix, as a resolvable issue. Illustrative embodiments categorize any application specific issue, which does not have a known fix or cannot be resolved by changes, as an unresolvable issue. Illustrative embodiments categorize issues as predictable when illustrative embodiments determine that the status of a running container can change to a failed state due to any disparity or variation in needed host node resources (e.g., memory, processor, storage, network, or the like) by the running container.

Thus, a container can enter a failed state based on a resolvable, unresolvable, or predictable issue. Illustrative embodiments are capable of addressing each particular type of issue (i.e., a resolvable, unresolvable, and predictable issue) by automatically analyzing container and host node agent logs, resource utilization monitoring data, and container exit code to determine whether the issue is resolvable, unresolvable, or predictable prior to container restart.

Therefore, illustrative embodiments incorporate intelligence into the container restart process, enabling illustrative embodiments to determine whether restarting a particular container will effectively resolve the issue that caused the failure. Illustrative embodiments utilize a solution agent to correlate a particular container exit code to a specific issue and an appropriate fix or solution if available. For example, the solution agent collates and indexes the container and host node agent logs with the container exit code to identify any issue or error pattern that may be causing the failed container state. In addition, the solution agent analyzes resource utilization monitoring data (i.e., host node resource utilization by the container) to obtain insights into the container's behavior and performance leading up to the failed container state. By monitoring resource utilization metrics, such as, for example, processor and memory utilization by the container, the solution agent can predict potential resource constraints that can trigger a failed container state and restart loop. Further, the solution agent analyzes the container exit codes, which can provide the solution agent with information regarding why a container entered the failed state. By analyzing the exit codes returned by the container, the solution agent can identify the specific issue or error that needs to be addressed prior to container restart.

The API server receives input from the solution agent via a decision-making controller regarding the issue causing the container failure and whether restarting the failed container will resolve the issue or not. If a fix needs to be applied to the failed container prior to the API server restarting the failed container, then the API server directs a runtime mutating webhook controller to apply the fix indicated by the solution agent to resolve the issue that caused the container failure. Moreover, the API server directs a source code management tracker to record the applied fix to correct the issue that caused the container failure for future reference.

It should be noted that Kubernetes includes a feature called admission webhooks, which are HTTP callbacks that receive and handle admission requests. There are two types of admission webhooks, a validating admission webhook and a mutating admission webhook. The mutating admission webhook is invoked first and modifies objects sent to the API server to enforce custom defaults. After all object modifications are complete, and after the incoming object is validated by the API server, the validating admission webhook is invoked and rejects requests to enforce custom policies. These admission webhooks work during resource (e.g., container) generation time. However, once the resource is generated, Kubernetes does not have a mechanism to apply changes at runtime. Illustrative embodiments provide a new controller, the runtime mutating webhook controller. The runtime mutating webhook controller of illustrative embodiments fixes or modifies resources (i.e., containers), which have already been generated, during runtime. In other words, the runtime mutating webhook controller of illustrative embodiments applies fixes or changes during runtime to existing containers. The runtime mutating webhook controller receives information from the solution agent via the decision-making controller and API server. The solution agent provides the information regarding any fix or modification needed for a specific container. Once the runtime mutating webhook controller receives the information from the solution agent, the runtime mutating webhook controller maintains a record of the container. For each respective container listed in a container registry of the runtime mutating webhook controller, the runtime mutating webhook controller tracks the specific fix or modification each particular container needs to be applied. Tracking all the specific container fixes or modifications enables the runtime mutating webhook controller to apply the correct fix or modification to the appropriate container and is effective on the next reconciliation of the container.

As an illustrative example scenario, each probe (i.e., start-up, readiness, and liveness probes) on a host node has a set of configuration parameters. The set of configuration parameters for each probe includes an initial delay seconds configuration parameter that indicates how many seconds the probe is to wait after a container starts (default: 0), a period seconds configuration parameter that indicates a wait time between probe executions (default: 10), a timeout seconds configuration parameter that indicates a timeout of the probe (default: 1), a success threshold configuration parameter that indicates the threshold needed for the probe to mark the container healthy (default: 1), and a failure threshold configuration parameter that indicates the threshold needed for the probe to mark the container unhealthy (default: 3).

In this illustrative example scenario, the configuration file (e.g., YAML file) to generate a container was supposed to have a test web application with an API endpoint "/healthz" on port 8080. However, while creating the configuration file for the container, the user specified the API endpoint incorrectly as "/health" with the following set of configuration parameters: initialDelaySeconds: 5; periodSeconds: 3; timeoutSeconds: 1; failureThreshold: 3; and successThreshold: 1. The readiness probe and liveness probe use these configuration parameters to detect when a failure of the container has occurred. For example, the readiness probe performs an application status check after an initial delay of 5 seconds. Because the user specified the API endpoint incorrectly, the current application status is "not ready," and the readiness probe increments the container failure counter by 1. After a period of 3 seconds, the readiness probe performs another application status check with the application status still as not ready because of the incorrectly specified API endpoint. As a result, the readiness probe again increments the container failure counter by 1. This cycle repeats until the container failure counter exceeds the failure threshold of 3. In response to the failure threshold being exceeded, the API server terminates the failed container.

However, current container-based environments will direct the API server to automatically restart the failed container without having any knowledge on whether the restart will resolve the issue (e.g., incorrectly specified API endpoint in the configuration file by user) that caused the failure. In contrast, illustrative embodiments utilize the decision-making controller, which receives information from the solution agent as to whether restarting the failed container will resolve the issue that caused the container failure, to direct the API server whether to restart the failed container or not. The solution agent indexes container issues with container exit codes for fast lookup to identify any potential fixes.

Thus, illustrative embodiments provide one or more technical solutions that overcome a technical problem with an inability of current container-based environments to determine whether a container restart will resolve the issue that cause the container to fail or not. As a result, these one or more technical solutions provide a technical effect and practical application in the field of container-based environments.

With reference now to FIG. 2, a diagram illustrating an example of an intelligent container management system is depicted in accordance with an illustrative embodiment. Intelligent container management system 201 is implemented in container-based environment 202, such as, for example, computing environment 100 in FIG. 1. In addition, container-based environment 202 may be, for example, Kubernetes or any other type of container orchestration environment, platform, architecture, or the like. Intelligent container management system 201 is a system of hardware and software components for intelligently determining whether restarting a failed container will resolve the issue that cause the container to fail or not.

In this example, intelligent container management system 201 includes controller node 204 and host node 206. Controller node 204 may be, for example, computer 101 in FIG. 1. Host node 206 may be, for example, one of host physical machine set 142 or virtual machine set 143 in FIG. 1. However, it should be noted that intelligent container management system 201 is intended as an example only and not as a limitation on illustrative embodiments. For example, intelligent container management system 201 can include any number of controller nodes, host nodes, and other devices and components not shown.

In this example, host node 206 includes host node agent 208, container 210, resources 214, probes 216, and log collector 222. Host node agent 208 is responsible for managing containers running on host node 206 and communicates with API server 232 of controller node 204. Container 210 can represent a set of containers located on host node 206. Container 210 provides the environment for application 212 to run. Application 212 provides a service, microservice, or the like to request client devices, which are not shown in this example. Resources 214 represent a group of resources, such as, for example, processor, memory, storage, and network resources needed by containers running on host node 206. Probes 216 represent a group of probes, such as, for example, a start-up probe, readiness probe, and liveness probe, which monitor the status of any container running on host node 206.

In this example, controller node 204 utilizes information obtained from probes 216 located on host node 206 to determine the current status of container 210. Controller node 204 uses the information obtained from the liveness probe of probes 216 to determine when container 210 should be restarted. For example, if the liveness probe detects that container 210 is unresponsive (e.g., application 212 is deadlocked due to a multithreading defect), then restarting container 210 may make application 212 available again. Controller node 204 uses the information obtained from the readiness probe of probes 216 to determine when container 210 is available to accept traffic. For example, controller node 204 uses the information obtained from the readiness probe to determine when container 210 is ready to provide the service corresponding to application 212. Controller node 204 uses the information obtained from the start-up probe of probes 216 to determine whether application 212 is slow starting. Joining the information obtained from the start-up probe with the information obtained from the readiness and liveness probes enables controller node 204 to increase availability of application 212.

It should be noted that no current container-based environment can ensure that restarting a container will resolve the issue that caused the container to fail. At present, current container-based environments just restart the container without knowing the issue that caused the container to fail. Automatically restarting the container on a regular time interval basis without knowing the issue that caused the container to fail increases unnecessary utilization of host node resources, such as resources 214. In contrast, controller node 204 utilizes container exit codes, container logs, host node agent logs, and resource utilization data as factors for determining whether restarting a container will resolve the issue that caused the container to fail or not prior to restarting the container.

Host node agent 208 monitors the status of container 210 by periodically running the readiness probe and the liveness probe of probes 216. Host node agent 208 writes its logs into host node agent log 218. When container 210 fails, host node agent 208 logs the relevant information into host node agent log 218, which includes, for example, name of container 210, container exit code, and other relevant details. In addition, container 210 logs relevant information in container log 220, which includes, for example, name of application 212, port number, and other application-specific details such as application error or exception. Using the information in host node agent log 218 and container log 220, each respective solution agent of solution agents 228 can generate its own corresponding search index that correlates specific container exit codes with corresponding issues causing container failure. Each respective solution agent utilizes its own corresponding search index to quickly lookup a particular exit code and its corresponding issue and known fix if any.

In this example, solution agents 228 include resolvable issue solution agent 242, unresolvable issue solution agent 244, and predictable issue solution agent 246. Resolvable issue solution agent 242 generates search index 248, unresolvable issue solution agent 244 generates search index 250, and predictable issue solution agent 246 generates search index 250 based on log information 238 and resource utilization data 240 received from log aggregator 224 and resource monitoring component 226, respectively. Search index 248 includes container exit codes 254, which correlate to resolvable container issues with a known fix. Search index 250 includes container exit codes 256, which correlate to unresolvable container issues without a fix. Search index 252 includes container exit codes 258, which correlate to predictable container issues with a corrective solution, such as, for example, increasing allocation of needed resources to a container by a determined amount.

Log collector 222 retrieves host node agent log 218 and container log 220 corresponding to container 210. Log collector 222 runs as a daemon on host node 206. After obtaining host node agent log 218 and container log 220 corresponding to container 210, log collector 222 then sends host node agent log 218 and container log 220 to log aggregator 224 on controller node 204. Log aggregator 224 stores and maintains all container logs and host node logs in a log timeseries database. Resource monitoring component 226 collects and stores resource utilization data 240 corresponding to container 210 in a time series database as well. For example, solution agents 228 can obtain resource utilization data 240 corresponding to a particular point in time by querying the resource utilization time series database. Resource utilization data 240 include, for example, metrics corresponding to processor, memory, storage, and network utilization by container 210.

Controller node 204 utilizes the different solution agents of solution agents 228 when a failure of container 210 occurs to determine whether the issue that caused the failure is resolvable with a fix, unresolvable, or predictable. It should be noted that each particular solution agent can specify search queries, filters, and aggregations to retrieve relevant log information and resource utilization data from log aggregator 224 and resource monitoring component 226, respectively.

Upon retrieving log information 238 and resource utilization data 240 corresponding to the failure of container 210, each solution agent identifies container 210, application 212, and the error code corresponding to the container failure. Each solution agent then searches its corresponding search index for that particular error code. If the error code indicates an unresolvable issue in search index 250 of unresolvable issue solution agent 244, then unresolvable issue solution agent 244 informs decision-making controller 230 that the issue is unresolvable and that container 210 should be terminated and not restarted. In response to receiving the indication that container 210 should be terminated without restart, decision-making controller 230 sends a false indicator to API server 232 regarding container 210.

However, if the error code indicates a resolvable issue in search index 248 of resolvable issue solution agent 242, then resolvable issue solution agent 242 is programmed to understand the issue causing the failure of container 210 and what should be modified to fix the issue. In addition, resolvable issue solution agent 242 can also use resource utilization data 240 to understand the reason for the failure (e.g., out of memory error) and then determine the solution (e.g., increase the memory allocation to container 210 by a determined amount). Once resolvable issue solution agent 242 identifies the appropriate fix, resolvable issue solution agent 242 then informs decision-making controller 230 of the fix. Decision-making controller 230 then informs API server 232 that a fix exists for the resolvable issue that caused container 210 to fail. API server 232 directs runtime mutating webhook controller 234 to apply the fix (e.g., change the settings of container 210) prior to API server 232 restarting container 210. Also, it should be noted that resolvable issue solution agent 242 can maintain its own database to keep track of any applied fixes and the resource utilization data for future reference. Decision-making controller 230 receives output from solution agents 228 and then determines whether the issue is resolvable or not based on the received output from solution agents 228. If decision-making controller 230 determines that the issue is resolvable, then decision-making controller 230 sends a true indicator to API server 232 for container 210. Conversely, if decision-making controller 230 determines that the issue is unresolvable, then decision-making controller 230 sends a false indicator to API server 232 for container 210.

API server 232 determines whether to restart container 210 based on which indicator API server 232 receives from decision-making controller 230. If API server 232 receives a false indicator, then API server 232 will not restart container 210 due to an unsolvable issue. If API server 232 receives a true indicator, then API server 232 will restart container 210 because the issue that caused container 210 to fail is resolvable. However, before API server 232 restarts container 210, runtime mutating webhook controller 234 applies the fix to container 210 for the resolvable issue. API server 232 securely sends the specification details of container 210 to runtime mutating webhook controller 234. Runtime mutating webhook controller 234 applies any needed changes to the specification of container 210 and responds back to API server 232 with any updated specification. API server 232 then schedules container 210 with the updated specification using a scheduler of controller node 204. Additionally, API server 232 generates an event indicating that any running containers similar to container 210 in container-based environment 202 should have the fix applied in the future upon restart.

It should be noted that runtime mutating webhook controller 234 operates at runtime during scheduling of a container. Runtime mutating webhook controller 234 maintains configuration files that contain details regarding containers, such as container 210, as well as any updated specifications. A REST API can dynamically update a configuration file. If there are any specification updates needed for container 210 by solution agents 228, then solution agents 228 can request the specification updates via the REST API and runtime mutating webhook controller 234 will make the needed specification updates in the configuration file. Runtime mutating webhook controller 234 receives the container specification input from API server 232. Runtime mutating webhook controller 234 makes any needed update to the container specification and then responds back with the updated container specification to API server 232. Using illustrative embodiments, the running application workload remains intact and only failed containers will receive the latest fix.

If the issue that caused container 210 to fail is resolvable with a fix, then source code management tracker 236 records the fix for reference by a system administrator. After reviewing the fix, the system administrator can make the decision to apply the fix to all same or similar containers running in container-based environment 202.

Figure 3A:
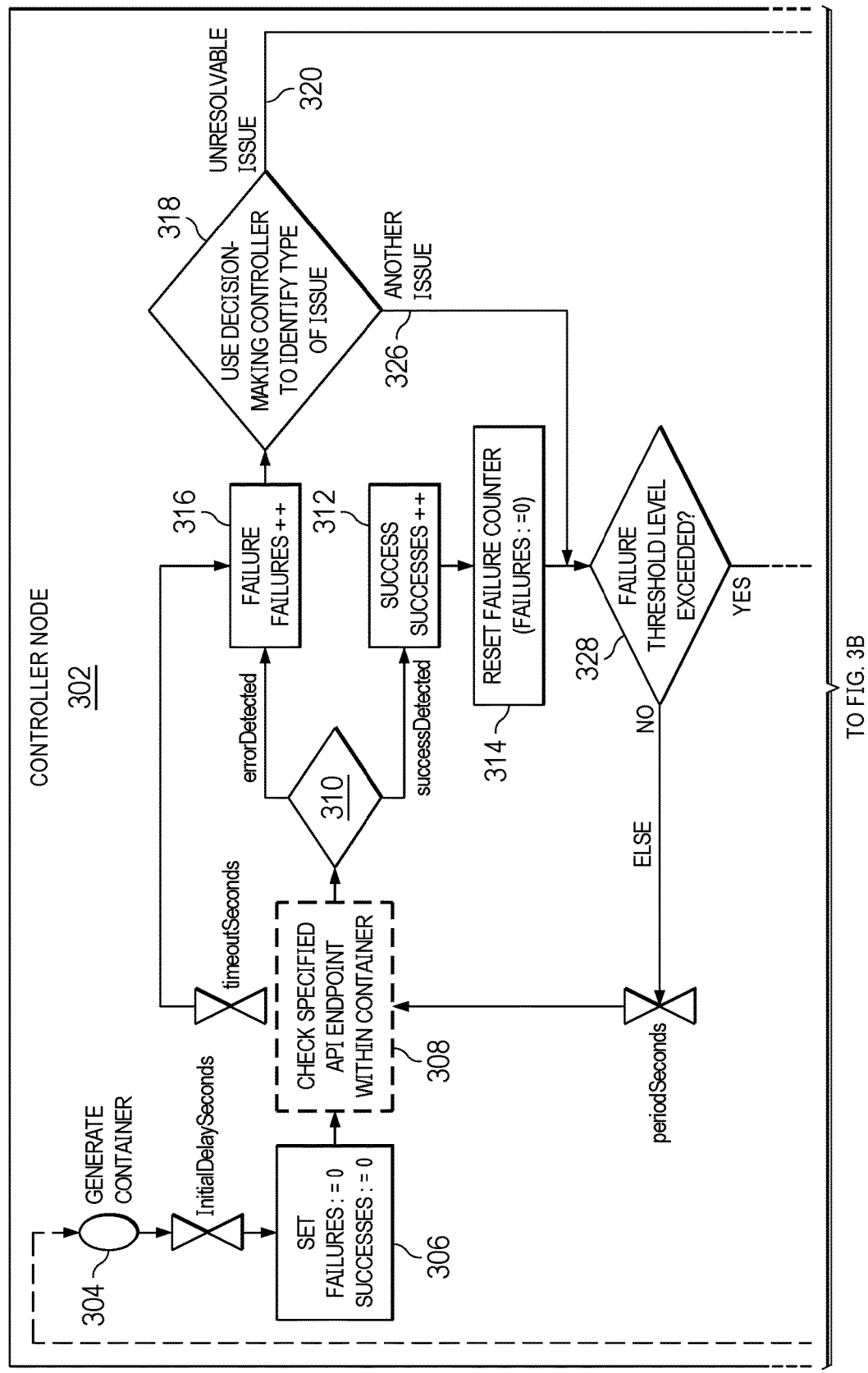
FIGS. 3A-3B are a diagram illustrating an example of an intelligent container management process in accordance with an illustrative embodiment.
Figure 3B:
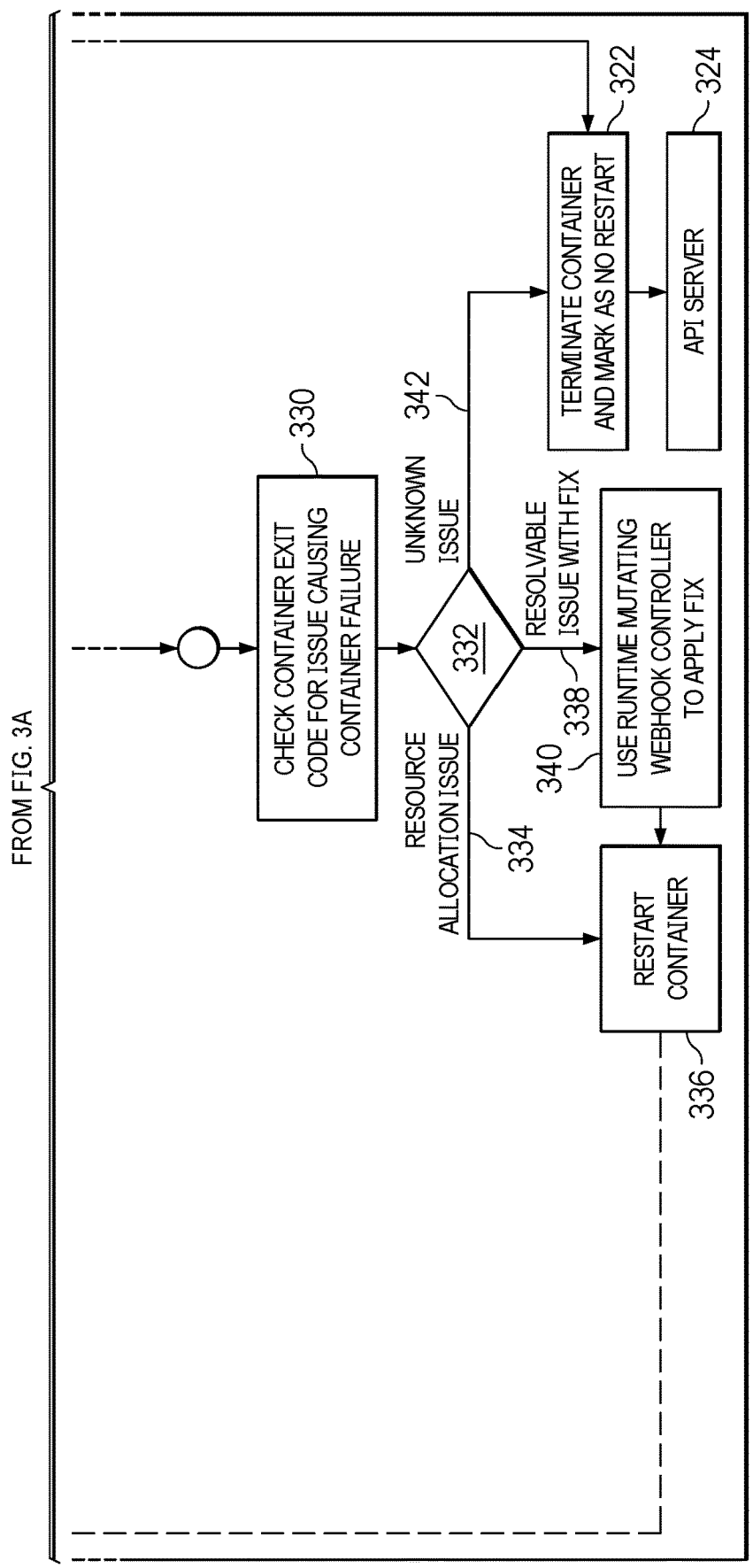

With reference now to FIGS. 3A-3B, a diagram illustrating an example of an intelligent container management process is depicted in accordance with an illustrative embodiment. Intelligent container management process 300 is implemented in controller node 302, such as, for example, controller node 204 in FIG. 2.

In this example, intelligent container management process 300 starts at 304 where controller node 302 generates a container. At 306, controller node 302 sets both container failures and container successes to zero after an initial delay of a defined number of seconds.

At 308, controller node 302 checks a specified API endpoint within the container. At 310, controller node 302 determines whether container success or container failure is detected based on checking the specified API endpoint within the container.

If controller node 302 detects success at 312, then controller node 302, at 314, resets the failure counter by decrementing the failure counter by 1. Alternatively, if controller node 302, at 316, detects failure, then controller node 302, at 314, resets the failure counter by incrementing the failure counter by 1. In addition, at 318, controller node 302 uses a decision-making controller to identify the type of issue causing the container failure.

If the decision-making controller, at 318, determines that the issue is unresolvable issue 320, then controller node 302, at 322, utilizes API server 324 to terminate the container and mark the container as no restart. Alternatively, if the decision-making controller, at 318, determines that the issue is another issue 326, then controller node 302, at 328, determines whether the number of container failures in the failure counter exceeds a defined failure threshold level.

If controller node 302, at 328, determines that the number of container failures in the failure counter does not exceed the defined failure threshold level, then controller node 302, after a defined period of seconds, rechecks the specified API endpoint within the container at 308. Alternatively, if controller node 302, at 328, determines that the number of container failures in the failure counter does exceed the defined failure threshold level, then controller node 302, at 330, checks the container exit code for the issue causing the container failure.

At 332, controller node 302 determines the issue causing the container failure based on the container exit code. If controller node 302 determines that the issue is resource allocation issue 334, then controller node 302 reallocates the needed resources to the container and, at 336, restarts the container. If controller node 302 determines that the issue is resolvable issue with fix 338, then controller node 302, at 340, uses a runtime mutating webhook controller to apply the fix. Afterward, controller node 302, at 336, restarts the container. If controller node 302 determines that the issue is unknown issue 342, then controller node 302, at 322, utilizes API server 324 to terminate the container and mark the container as no restart.

Figure 4B:
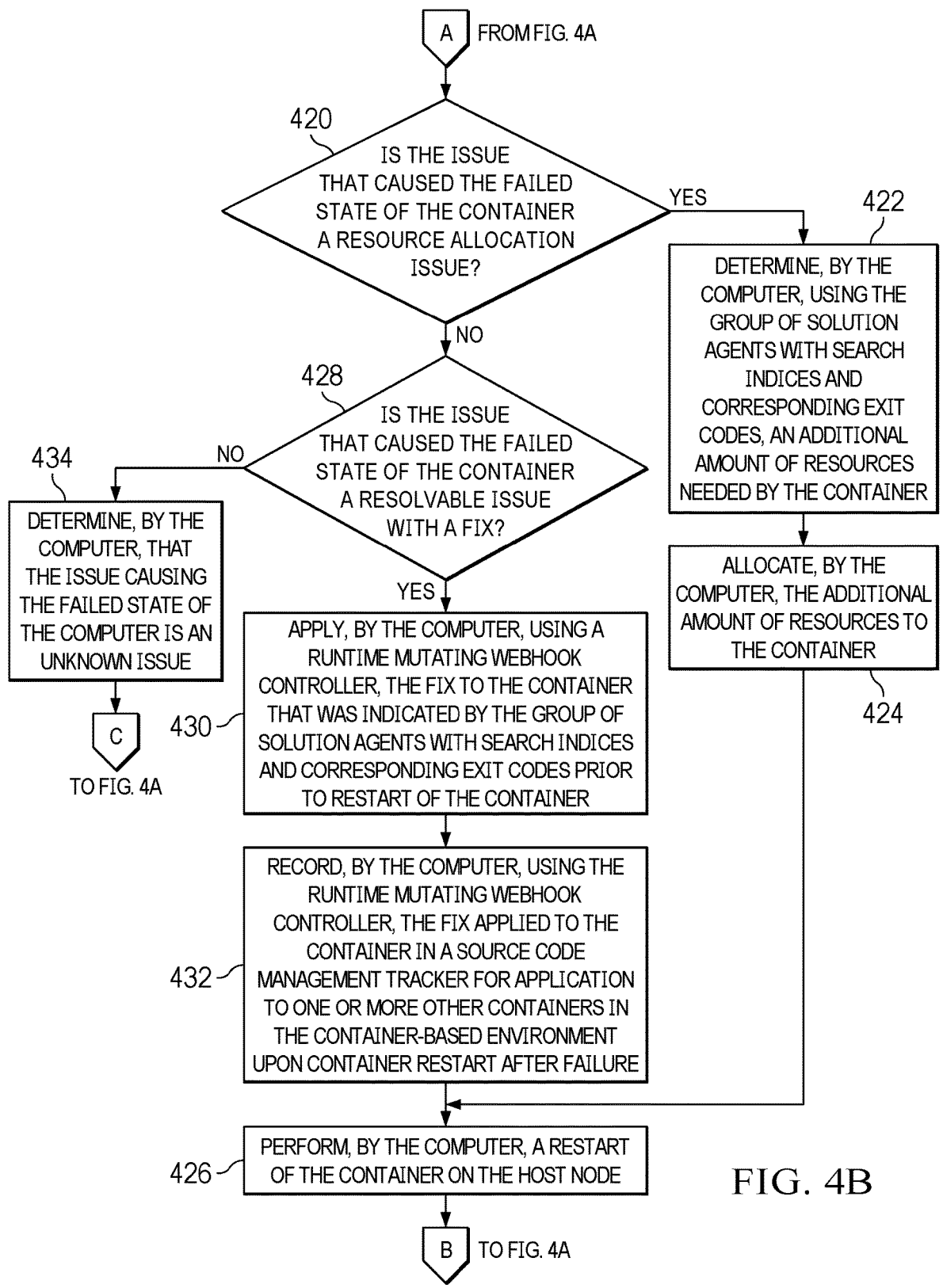

With reference now to FIGS. 4A-4B, a flowchart illustrating a process for intelligent container management is shown in accordance with an illustrative embodiment. The process shown in FIGS. 4A-4B may be implemented in a computer, such as, for example, computer 101 in FIG. 1, controller node 204 in FIG. 2, or controller node 302 in FIGS. 3A-3B. For example, the process shown in FIGS. 4A-4B may be implemented by intelligent container management code 200 in FIG. 1.

The process begins when the computer receives an input to generate a container on a host node in a container-based environment (step 402). In response to receiving the input, the computer generates the container on the host node (step 404).

Afterward, the computer receives information regarding a status of the container from a group of probes located on the host node (step 406). The computer makes a determination as to whether the information regarding the status of the container received from the group of probes indicates that the container is in a failed state (step 408).

If the computer determines that the information regarding the status of the container received from the group of probes does not indicate that the container is in a failed state, no output of step 408, then the process returns to step 406 where the computer continues to receive the information regarding the status of the container from the group of probes. If the computer determines that the information regarding the status of the container received from the group of probes does indicate that the container is in the failed state, yes output of step 408, then the computer retrieves exit code information, container log information, host node agent log information, and resource utilization data corresponding to the container (step 410).

The computer, using a group of solution agents with search indices and corresponding exit codes, performs an analysis of the exit code information, the container log information, the host node agent log information, and the resource utilization data corresponding to the container (step 412). The computer, using the group of solution agents with search indices and corresponding exit codes, identifies an issue that caused the failed state of the container based on the analysis of the exit code information, the container log information, the host node agent log information, and the resource utilization data corresponding to the container (step 414).

The computer makes a determination as to whether the issue that caused the failed state of the container is an unresolvable issue (step 416). If the computer determines that the issue that caused the failed state of the container is an unresolvable issue, yes output of step 416, then the computer terminates the container and marks the container as no restart (step 418). Thereafter, the process terminates. If the computer determines that the issue that caused the failed state of the container is not an unresolvable issue, no output of step 416, then the computer makes a determination as to whether the issue that caused the failed state of the container is a resource allocation issue (step 420).

If the computer determines that the issue that caused the failed state of the container is a resource allocation issue, yes output of step 420, then the computer, using the group of solution agents with search indices and corresponding exit codes, determines an additional amount of resources needed by the container (step 422). Further, the computer allocates the additional amount of resources to the container (step 424). Afterward, the computer performs a restart of the container on the host node (step 426). Thereafter, the process returns to step 406 where the computer receives information regarding the status of the container from the group of probes on the host node.

Returning again to step 420, if the computer determines that the issue that caused the failed state of the container is not a resource allocation issue, no output of step 420, then the computer makes a determination as to whether the issue that caused the failed state of the container is a resolvable issue with a fix (step 428). If the computer determines that the issue that caused the failed state of the container is a resolvable issue with a fix, yes output of step 428, then the computer, using a runtime mutating webhook controller, applies the fix to the container that was indicated by the group of solution agents with search indices and corresponding exit codes prior to restart of the container (step 430). In addition, the computer, using the runtime mutating webhook controller, records the fix applied to the container in a source code management tracker for application to one or more other containers in the container-based environment upon container restart after failure (step 432). In other words, the computer, using the runtime mutating webhook controller, captures the fix applied to the container in the source code management tracker for future reference. Thereafter, the process returns to step 426 where the computer performs the restart of the container on the host node.

Returning again to step 428, if the computer determines that the issue that caused the failed state of the container is not a resolvable issue with a fix, no output of step 428, then the computer determines that the issue causing the failed state of the computer is an unknown issue (step 434). Thereafter, the process returns to step 418 where the computer terminates the container and marks the container as no restart.

Thus, illustrative embodiments of the present disclosure provide a computer-implemented method, computer system, and computer program product for intelligent container management. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for intelligent container management, the computer-implemented method comprising: identifying, by a computer, using a group of solution agents, an issue that caused a failed state of a container based on an analysis of exit code information, container log information, host node agent log information, and resource utilization data corresponding to the container; determining, by the computer, whether the issue that caused the failed state of the container is a resolvable issue with a fix; applying, by the computer, using a runtime mutating webhook controller, the fix to the container prior to restart of the container in response to the computer determining that the issue that caused the failed state of the container is the resolvable issue with the fix; and performing, by the computer, the restart of the container on a host node after applying the fix.

2. The computer-implemented method of claim 1, further comprising:
recording, by the computer, using the runtime mutating webhook controller, the fix applied to the container in a source code management tracker for application to one or more other containers in a container-based environment upon container restart after failure.

3. The computer-implemented method of claim 1, further comprising:
determining, by the computer, whether the issue that caused the failed state of the container is an unresolvable issue; and
terminating, by the computer, the container and marking the container as no restart in response to the computer determining that the issue that caused the failed state of the container is the unresolvable issue.

4. The computer-implemented method of claim 1, further comprising:
determining, by the computer, whether the issue that caused the failed state of the container is a resource allocation issue;
determining, by the computer, using the group of solution agents, an additional amount of resources needed by the container in response to the computer determining that the issue that caused the failed state of the container is the resource allocation issue;
allocating, by the computer, the additional amount of resources to the container; and
performing, by the computer, the restart of the container on the host node.

5. The computer-implemented method of claim 1, further comprising:
receiving, by the computer, an input to generate the container on the host node in a container-based environment;
generating, by the computer, the container on the host node in response to receiving the input;
receiving, by the computer, information regarding a status of the container from a group of probes located on the host node; and
determining, by the computer, whether the information regarding the status of the container received from the group of probes indicates that the container is in the failed state.

6. The computer-implemented method of claim 5, further comprising:
retrieving, by the computer, the exit code information, the container log information, the host node agent log information, and the resource utilization data corresponding to the container in response to the computer determining that the information regarding the status of the container received from the group of probes indicates that the container is in the failed state.

7. The computer-implemented method of claim 1, further comprising:
determining, by the computer, that the issue causing the failed state of the computer is an unknown issue in response to the computer determining that the issue that caused the failed state of the container is not the resolvable issue with the fix; and
terminating, by the computer, the container and marking the container as no restart.

8. A computer system for intelligent container management, the computer system comprising: a communication fabric; a set of computer-readable storage media connected to the communication fabric, wherein the set of computer-readable storage media collectively stores program instructions; and a set of processors connected to the communication fabric, wherein the set of processors executes the program instructions to: identify, using a group of solution agents, an issue that caused a failed state of a container based on an analysis of exit code information, container log information, host node agent log information, and resource utilization data corresponding to the container; determine whether the issue that caused the failed state of the container is a resolvable issue with a fix; apply, using a runtime mutating webhook controller, the fix to the container prior to restart of the container in response to determining that the issue that caused the failed state of the container is the resolvable issue with the fix; and perform the restart of the container on a host node after applying the fix.

9. The computer system of claim 8, wherein the set of processors further executes the program instructions to:
record, using the runtime mutating webhook controller, the fix applied to the container in a source code management tracker for application to one or more other containers in a container-based environment upon container restart after failure.

10. The computer system of claim 8, wherein the set of processors further executes the program instructions to:
determine whether the issue that caused the failed state of the container is an unresolvable issue; and
terminate the container and mark the container as no restart in response to determining that the issue that caused the failed state of the container is the unresolvable issue.

11. The computer system of claim 8, wherein the set of processors further executes the program instructions to:
determine whether the issue that caused the failed state of the container is a resource allocation issue;
determine, using the group of solution agents, an additional amount of resources needed by the container in response to determining that the issue that caused the failed state of the container is the resource allocation issue;
allocate the additional amount of resources to the container; and
perform the restart of the container on the host node.

12. The computer system of claim 8, wherein the set of processors further executes the program instructions to:

receive an input to generate the container on the host node in a container-based environment;

generate the container on the host node in response to receiving the input;

receive information regarding a status of the container from a group of probes located on the host node; and determine whether the information regarding the status of the container received from the group of probes indicates that the container is in the failed state.

13. The computer system of claim 12, wherein the set of processors further executes the program instructions to:

retrieve the exit code information, the container log information, the host node agent log information, and the resource utilization data corresponding to the container in response to determining that the information regarding the status of the container received from the group of probes indicates that the container is in the failed state.

14. A computer program product for intelligent container management, the computer program product comprising a set of computer-readable storage media having program instructions collectively stored therein, the program instructions executable by a computer to cause the computer to: identify, using a group of solution agents, an issue that caused a failed state of a container based on an analysis of exit code information, container log information, host node agent log information, and resource utilization data corresponding to the container; determine whether the issue that caused the failed state of the container is a resolvable issue with a fix; apply, using a runtime mutating webhook controller, the fix to the container prior to restart of the container in response to determining that the issue that caused the failed state of the container is the resolvable issue with the fix; and perform the restart of the container on a host node after applying the fix.

15. The computer program product of claim 14, wherein the program instructions further cause the computer to:

record, using the runtime mutating webhook controller, the fix applied to the container in a source code management tracker for application to one or more other containers in a container-based environment upon container restart after failure.

16. The computer program product of claim 14, wherein the program instructions further cause the computer to:

determine whether the issue that caused the failed state of the container is an unresolvable issue; and terminate the container and mark the container as no restart in response to determining that the issue that caused the failed state of the container is the unresolvable issue.

17. The computer program product of claim 14, wherein the program instructions further cause the computer to:

determine whether the issue that caused the failed state of the container is a resource allocation issue;

determine, using the group of solution agents, an additional amount of resources needed by the container in response to determining that the issue that caused the failed state of the container is the resource allocation issue;

allocate the additional amount of resources to the container; and perform the restart of the container on the host node.

18. The computer program product of claim 14, wherein the program instructions further cause the computer to:

receive an input to generate the container on the host node in a container-based environment;

generate the container on the host node in response to receiving the input;

receive information regarding a status of the container from a group of probes located on the host node; and determine whether the information regarding the status of the container received from the group of probes indicates that the container is in the failed state.

19. The computer program product of claim 18, wherein the program instructions further cause the computer to:

retrieve the exit code information, the container log information, the host node agent log information, and the resource utilization data corresponding to the container in response to determining that the information regarding the status of the container received from the group of probes indicates that the container is in the failed state.

20. The computer program product of claim 14, wherein the program instructions further cause the computer to:

determine that the issue causing the failed state of the computer is an unknown issue in response to determining that the issue that caused the failed state of the container is not the resolvable issue with the fix; and terminate the container and mark the container as no restart.

* * * * *